United States Patent [19]

Schumacher

[11] 4,189,193
[45] Feb. 19, 1980

[54] CRANKSHAFT BEARING

[75] Inventor: Arnold Schumacher, Winterthur, Switzerland

[73] Assignee: Sulzer Brothers Limited, Winterthur, Switzerland

[21] Appl. No.: 915,723

[22] Filed: Jun. 15, 1978

[30] Foreign Application Priority Data

Jun. 17, 1977 [CH] Switzerland ............. 7450/77

[51] Int. Cl.² .................................. F16C 9/02
[52] U.S. Cl. .................... 308/23; 123/195 H; 308/74
[58] Field of Search ............ 308/23, 3 R, 74, 179; 74/595, 600, 586; 123/195

[56] References Cited

U.S. PATENT DOCUMENTS

| | | | |
|---|---|---|---|
| 2,647,494 | 8/1953 | Ware | 308/23 |
| 3,304,134 | 2/1967 | Allen | 308/74 X |
| 3,782,792 | 1/1974 | Pfleiderer | 308/23 |

Primary Examiner—Douglas C. Butler
Attorney, Agent, or Firm—Kenyon & Kenyon

[57] ABSTRACT

The crankshaft bearing uses various guide surfaces on the casing and cap to center and guide the cap into place in the casing. The guide surfaces are formed by a single machining step and are subdivided into separate portions. The studs which secure the cap to the casing each have a centering collar which is received in a bore of the cap to aid the centering of the cap during assembly.

3 Claims, 9 Drawing Figures

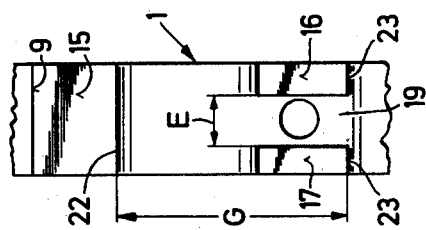
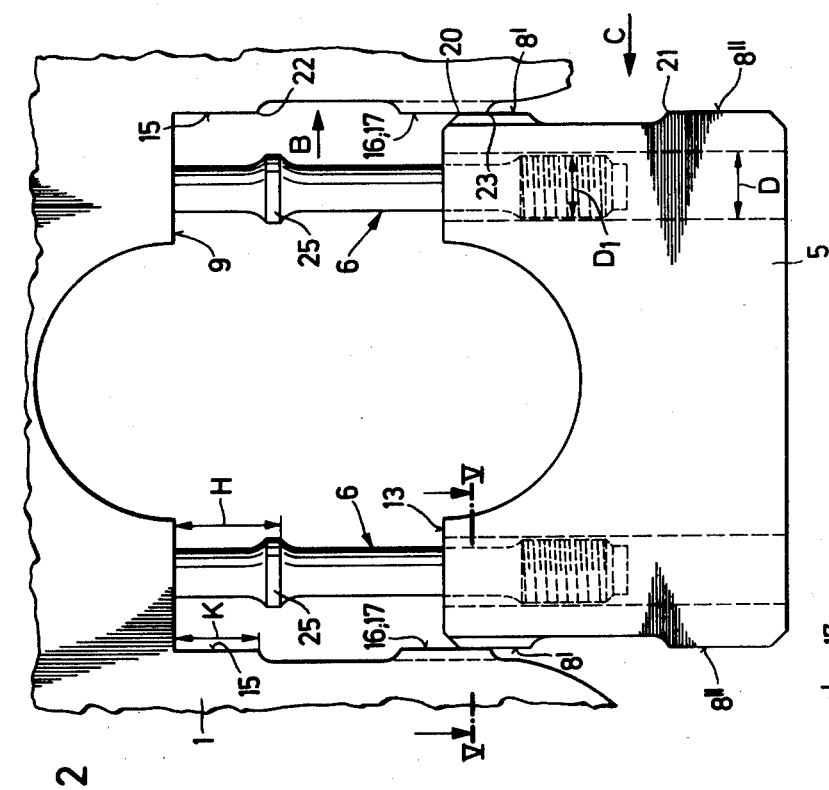
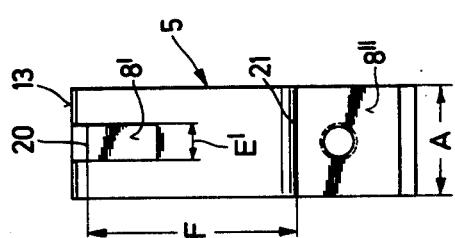
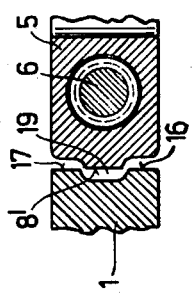

CRANKSHAFT BEARING

This invention relates to a crankshaft bearing and, particularly, a crankshaft bearing for an internal combustion engine.

As is known, crankshaft bearings for internal combustion machines are usually formed by a casing and a cap which is releasably secured to the casing via bolts. The casing usually receives one half of a crank pin while the cap receives the remaining half of the crank pin. Generally, the cap has two parallel guide surfaces which are each disposed in one plane and extend perpendicularly to a gap between the cap and the casing. The cap is thus able to slide by way of these surfaces on matching surfaces of the casing during assembly. Further, the guide-surface end which is near the gap passes the matching-surface end which is distal from the gap.

In one known bearing of this kind, the cap guide surfaces and the corresponding matching surfaces in the casing are, in each case, disposed at two different spacings in relation to the crank-pin axis. Also, the surfaces which are near the gap are further apart than the surfaces at the end distal from the gap. However, surfaces which are devised in this way cause difficulties in production engineering since the cap guide surfaces and the matching surfaces in the casing have to be produced in two machining steps. Another disadvantage occurs during assembly of the cap, that is, because of the smaller spacing between the surfaces remote from the gap, the cap has to be moved in two different directions, viz. first parallel to the crank pin axis and secondly transversely thereto. In this case, therefore, the cap guide surfaces near the gap do not move along the casing guide surfaces remote from the gap.

The cap guide surfaces and the casing matching surfaces can, of course, also be arranged at two different spacings in relation to the crank pin axis, the surfaces which are near the gap having a smaller spacing than the surfaces at the end distal from the gap. This arrangement also has disadvantages for production engineering since the surfaces have to be produced in two machining steps.

Accordingly, it is an object of the invention to provide a crankshaft bearing with guide surfaces which can be machined in one step.

It is another object of the invention to provide a crankshaft bearing which can be readily assembled.

Briefly, the invention is directed to a crankshaft bearing which is comprised of a casing for receiving a part of a crank pin and a cap which is releasably received within the casing to define a gap with the casing and to receive a remaining part of the crank pin. In accordance with the invention, a pair of parallel guide surface means are formed on the casing while a pair of parallel guided surface means are formed on the cap.

Each of the guide surface means on the casing is subdivided to include a first portion disposed near the gap and a pair of parallel axially spaced apart portions disposed distally from the gap to define a groove.

Each of the guided surface means on the cap is also subdivided to include a narrow portion disposed near the gap and centrally of the axial width of the cap and a widened portion disposed distally from the gap. Further, each narrow portion is of an axial width relative to the crank pin axis to pass through a respective groove formed between the pair of parallel portions on the casing while being slidably received on the first portion of the guide means on the casing. Also, each widened portion is slidably received on a respective pair of parallel portions of the guide means on the casing.

The novel step of subdividing each guide surface on the cap into two surface portions and each matching surface into three portions which are disposed in the same plane facilitates machining of the surface portions in one step and leads to ready assembly of the cap, since the co-operating surface portions slide on one another during assembly only along a short distance of the cap. Consequently, there is no risk of the cap jamming, even when the cap guided surfaces near the gap are moved past the casing guide surfaces distal from the gap. Assembly and dismantling are facilitated too since all the movements are rectilinear and transverse to the crank pin axis.

These and other objects and advantages of the invention will become more apparent from the following detailed description taken in conjunction with the accompanying drawings wherein:

FIG. 2 illustrates a view of the cap of the crankshaft bearing in a first assembly position, the crank pin having been omitted from the drawing for the sake of simplicity;

FIG. 3 illustrates a view taken in the direction of an arrow B in FIG. 2 of a guide surface means on the casing;

FIG. 4 illustrates a view taken in the direction of an arrow C in FIG. 2 of a guided surface means on the cap;

FIG. 5 illustrates a view taken on line V—V of FIG. 2;

Figure 1:
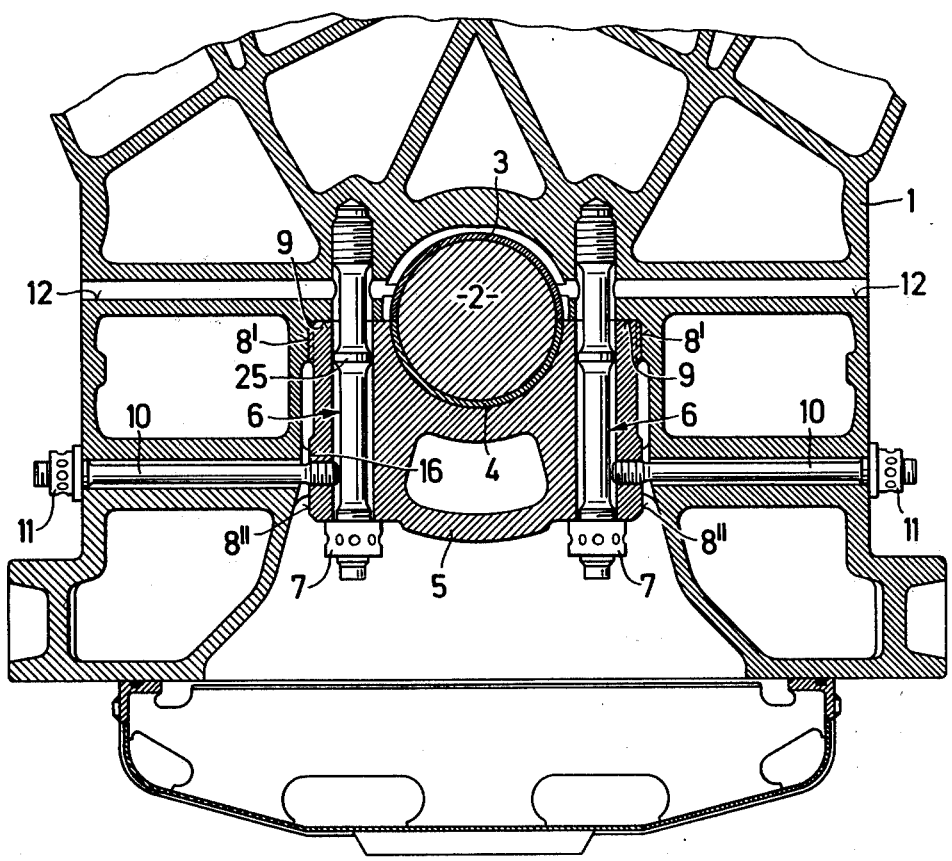
FIG. 1 illustrates a cross-sectional view through a crankshaft bearing according to the invention.

Referring to FIG. 1, an engine casing 1 of an internal combustion engine has a pin 2 of a crankshaft (no further details of which are shown) mounted therein. The top half of the cross-section of the crank pin 2 is disposed in a bearing shell 3 in the casing 1 while the bottom half of the cross-section of the pin 2 is disposed in a bearing shell 4 disposed in the cap 5. The cap 5 is releasably secured to the casing 1 from below through the agency of two screwthreaded pins or studs 6 which are threaded into the casing 1, each extend through a bone of the cap 5 on either side of the crank pin 2 and each have nut 7 at the bottom end which bears on the cap 5.

The cap 5 has a pair of parallel guided surface means 8', 8" extending at right angles to a gap 9 which is present between the two shells 3, 4 and between the casing 1 and the cap 5 in the plane in which the axis of the crank pin 2 is disposed. Matching guided surface means are disposed on the casing 1 to cooperate with the guided surface means 8', 8" and are of a construction described with reference to FIGS. 2 to 9.

Referring to FIGS. 2 and 4, each guided surface means is subdivided to include a narrow portion 8' disposed near the gap 9 and a widened portion 8" disposed at the end distally from the gap 9. The narrow portion 8' which is near a surface 13 of the cap 5 which bounds the gap 9 is of an axial width E' less than the axial width A of the cap 5 while the widened portion 8" extends across the entire width of the cap 5.

Referring to FIG. 3, each of the matching guide surface means on the casing 1 which cooperates with the guided surface portions 8', 8" of the cap 5 is subdivided into three surface portions 15, 16, 17. One surface portion 15 is disposed near the gap 9 and is of an axial width corresponding to the cap width A while the remaining pair of portions 16, 17 are spaced apart axially at an end distal from the gap 9 to define a groove 19 of a width E. If required, the width of the surface portion 15 can be the same as the width of the surface portion 8'.

As shown in FIGS. 2 and 4, each narrow surface portion 8' has an edge 20 near the gap 9 which is located at a distance F (FIG. 4) from an edge 21 of the widened surface portion 8" which is also near the gap 9. This distance F is smaller than the distance G (FIG. 3) between, on the one hand, that edge 22 of the surface portion 15 which is distal from the gap 9 and, on the other hand, those edges 23 of the surface portions 16, 17 which are distal from the gap 9. The edge 20 is also set back from the surface 13 because of a bevel.

The surface portions 15 on the casing 1 are positioned to slidably receive the narrowed portions 8' on the cap 5 while the grooves 19 (FIG. 3) are sized to permit passage of the narrow portions 8' without obstruction as indicated in FIG. 5. To this end, the clearance E between the surface portions 16, 17 (i.e., the width of the groove 19) is greater than the width E' of a corresponding narrow portion 8'.

Referring to FIG. 2, each of the studs 6 has a centering collar 25 which is located at a distance H from the gap 9 which is greater than the length K of the surface portions 15 on the casing 1 taken in the direction of cap movement. As shown, the end of each stud 6 is threaded to receive the nut 7 and has a diameter $D_1$ which is less than the diameter D of the bore in the cap 5.

Referring to FIG. 1, a plurality of screwthreaded pins or studs 10 are threaded into the cap 5 near the widened surface portions 8". Each of these studs 10 extends through the casing to the outside and perpendicularly to the pins 6 and has a nut 11 at the free end. The two studs 10 and their nuts 11 provide an additional securing of the cap 5 in the casing 1 to ensure that forces applied by the pistons to the crankshaft at an angle to the vertical are transmitted to the casing 1.

The casing 1 also has two ducts 12 above the gap 9 which extend to near the shell 3 and serve to supply lubricant to the bearing.

Figure 6:
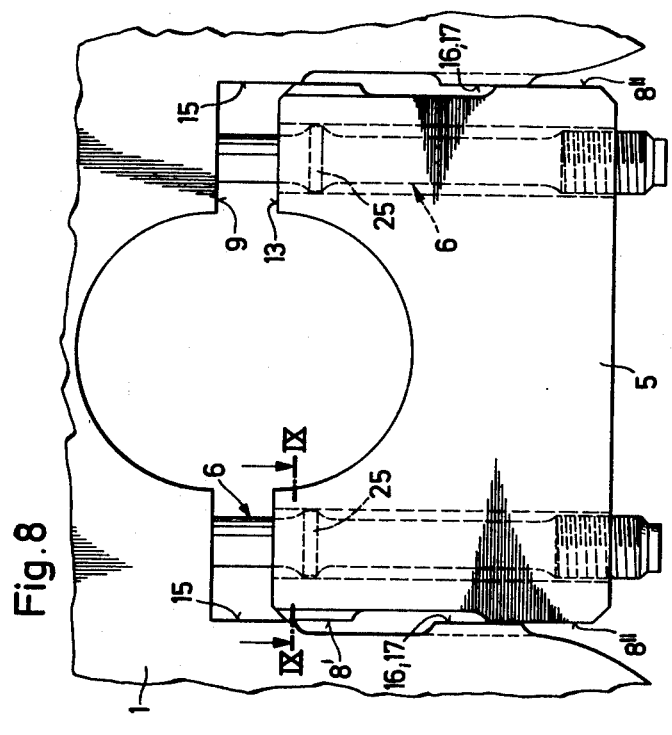
FIG. 6 illustrates a view of the cap in a second assembly position.
Figure 7:
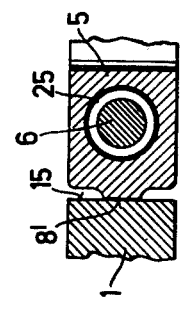
FIG. 7 illustrates a view taken on line VII—VII FIG. 6.
Figure 8:
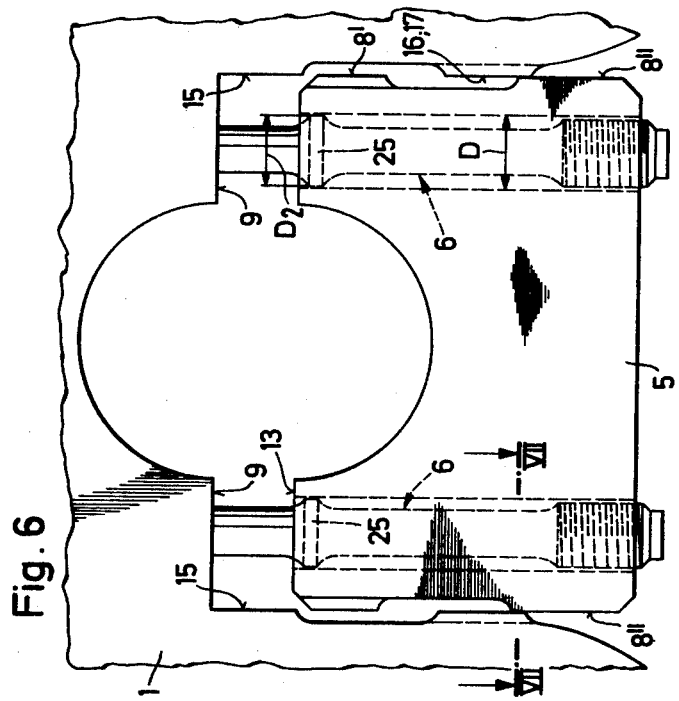
FIG. 8 illustrates the cap in a third assembly position.
Figure 9:
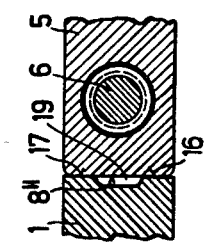
FIG. 9 illustrates a view taken on line IX—IX of FIG. 8.

In order to assemble the bearing, the cap 5 is pushed up from below over the two pins 6 in the manner shown in FIG. 2. Initially, there is merely an approximate centering between each bore D and the corresponding screwthreaded portion $D_1$ of the pins 6. There is, however, no centering between the surface portions 16 and 17 and the narrow surface portion 8' of the cap 5, such portion coming near the portions 16, 17, as can be gathered from FIG. 5. As can be seen in FIG. 6, as the cap 5 moves further upwards, the centering collars 25 of the two pins 6 contact the bore D. Also, the cap surface portion 8" contacts the casing surface portions 16, 17. Consequently, and as can be seen in FIG. 7, there is a finer centering than previously in the bores D and there is also a first centering of the cap 5 on the matching surfaces in the casing 1. As the cap 5 moves still further upwards, the two narrow surface portions 8' engage with the associated casing surface portions 15, and so the cap 5 starts to be centered near the gap 9 (cf. FIG. 9). The nuts 7 (FIG. 1) are then engaged on the pins 6 and secured thereon, whereafter the studs 10 can be screwed into place.

What is claimed is:

1. A crankshaft bearing comprising
    a casing for receiving a part of a crank pin;
    a cap releasably received within said casing to define a gap with said casing and to receive a remaining part of the crank pin;
    a pair of parallel guide surface means on said casing, each said means including a first portion disposed near said gap and a pair of parallel axially spaced apart portions disposed distally from said gap to define a groove therebetween; and
    a pair of parallel guided surface means on said cap, each said guided surface means including a narrow portion disposed near said gap and a widened portion disposed distally from said gap, each said narrow portion being of an axial width to pass through a respective groove of said guide surface means on said casing while being slidably received on a respective first portion of said guide means on said casing and each said widened portion being slidably received on a respective pair of said parallel portions of said guide surface means on said casing.

2. A crankshaft bearing as set forth in claim 1 which further comprises a plurality of studs extending through said cap into threaded engagement with said casing to retain said cap on said casing, each stud having a centering collar within said cap disposed at a distance from said gap greater than the length of each said first portion of said guide surface means in the direction of cap movement.

3. A crankshaft bearing as set forth in claim 1 wherein each said narrow portion and said widened portion of each said guided surface means having an edge near said gap and each said first portion and said pair of parallel portions of said guide surface means having an edge remote from said gap, the distance between said edges near said gap being less than the distance between said edges remote from said gap.

* * * * *

UNITED STATES PATENT AND TRADEMARK OFFICE
CERTIFICATE OF CORRECTION

PATENT NO. : 4,189,193

DATED : February 19, 1980

INVENTOR(S) : Arnold Schumacher

It is certified that error appears in the above-identified patent and that said Letters Patent are hereby corrected as shown below:

Column 1, line 5, after "particularly" delete second occurrence of --,--

Column 2, line 36, after "VII-VII" insert --of--

Column 2, line 53 after "have" insert --a--

Signed and Sealed this

Fifteenth Day of July 1980

[SEAL]

Attest:

SIDNEY A. DIAMOND

Attesting Officer

Commissioner of Patents and Trademarks